United States Patent
Hoang et al.

(10) Patent No.: US 9,561,907 B2
(45) Date of Patent: Feb. 7, 2017

(54) CONVEYOR FOR TRANSPORTING ARTICLES ALONG A GENERALLY VERTICAL PATH AND ENDLESS CARRIER FOR A CONVEYOR

(71) Applicant: Transnorm System, Inc., Arlington, TX (US)

(72) Inventors: Harlen Hoang, Arlington, TX (US); James Sulzer, Euless, TX (US); Michael Hake, Flower Mound, TX (US); John Langsdorf, Bedford, TX (US); Rick Lee, Danville, KY (US)

(73) Assignee: TRANSNORM SYSTEM, INC., Arlington, TX (US)

( * ) Notice: Subject to any disclaimer, the term of this patent is extended or adjusted under 35 U.S.C. 154(b) by 0 days.

(21) Appl. No.: 14/768,716

(22) PCT Filed: Oct. 27, 2014

(86) PCT No.: PCT/US2014/062333
§ 371 (c)(1),
(2) Date: Aug. 18, 2015

(87) PCT Pub. No.: WO2015/073192
PCT Pub. Date: May 21, 2015

(65) Prior Publication Data
US 2016/0272431 A1    Sep. 22, 2016

Related U.S. Application Data

(60) Provisional application No. 61/902,885, filed on Nov. 12, 2013.

(51) Int. Cl.
B65G 21/18    (2006.01)
B65G 17/24    (2006.01)
B65G 17/06    (2006.01)
B65G 17/08    (2006.01)
B65G 21/20    (2006.01)
B65G 17/30    (2006.01)

(52) U.S. Cl.
CPC ............. *B65G 17/24* (2013.01); *B65G 17/066* (2013.01); *B65G 17/086* (2013.01); *B65G 17/30* (2013.01); *B65G 21/18* (2013.01); *B65G 21/20* (2013.01); *B65G 2207/44* (2013.01)

(58) Field of Classification Search
CPC ...................................... B65G 21/18
USPC ................. 198/778, 831, 850, 853
See application file for complete search history.

(56) References Cited

U.S. PATENT DOCUMENTS 3,627,109 A    12/1971 Cabak
3,826,352 A    7/1974 Van Zon et al.
(Continued)

FOREIGN PATENT DOCUMENTS

WO    WO 2012154030    11/2012
WO    WO 2013144139 A1    10/2013

*Primary Examiner* — Gene Crawford
*Assistant Examiner* — Lester Rushin
(74) *Attorney, Agent, or Firm* — Business Patent Law, PLLC; Kenneth F. Pearce (57) ABSTRACT

The present invention is an endless carrier for a conveyor. The endless carrier is equipped with a chain including roller bearings for engaging a wall of the conveyor and slats with landing gears for engaging tracks of the conveyor. The endless carrier is particularly useful for a conveyor having one or more curves.

20 Claims, 5 Drawing Sheets

(56) References Cited

U.S. PATENT DOCUMENTS

| | | | |
|---|---|---|---|
| 4,194,616 | A | 3/1980 | Barthelemy et al. |
| 4,645,070 | A | 2/1987 | Homeier |
| 4,699,266 | A | 10/1987 | Weiss |
| 4,729,470 | A * | 3/1988 | Bacigalupe ............ B65G 17/061 104/140 |
| 5,081,750 | A * | 1/1992 | Molz ..................... B29C 55/165 198/838 |
| 5,176,247 | A | 1/1993 | Counter et al. |
| 5,586,644 | A | 12/1996 | Coen et al. |
| 5,775,480 | A | 7/1998 | Lapeyre et al. |
| 6,336,551 | B1 | 1/2002 | Balk |
| 7,556,142 | B2 | 7/2009 | Stebnicki et al. |
| 7,854,315 | B2 | 12/2010 | Stebnicki et al. |
| 7,963,389 | B2 | 6/2011 | Broers et al. |
| 8,100,254 | B2 | 1/2012 | Balk |
| 8,276,746 | B2 | 10/2012 | Klotzki |
| 8,393,462 | B2 | 3/2013 | Evan |
| 8,490,272 | B1 | 7/2013 | Langsdorf et al. |
| 2005/0150748 | A1 | 7/2005 | Zubair et al. |

* cited by examiner

CONVEYOR FOR TRANSPORTING ARTICLES ALONG A GENERALLY VERTICAL PATH AND ENDLESS CARRIER FOR A CONVEYOR

Applicants claim priority to PCT Application PCT International Patent Application entitled—Conveyor for Transporting Articles along a Generally Vertical Path and Endless Carrier for a Conveyor—, Ser. No. PCT/US2014/062333, filed Oct. 27, 2014; Transnorm System, Inc. that claims priority to Priority to U.S. Provisional Patent Application Ser. No. 61/902,885, filed Nov. 12, 2013, entitled—Conveyor for Transporting Articles along a Generally Vertical Path and Endless Carrier for a Conveyor—is claimed.

BACKGROUND OF THE INVENTION

A. Field of the Invention

Among other things, the present invention includes a conveyor for transporting articles along a generally vertical path and an endless carrier for a conveyor.

B. Description of the Previous Art

Any discussion of references cited in this Description of the Previous Art merely summarizes the disclosures of the cited references and the inventors make no admission that any cited reference or portion thereof is relevant prior art. The inventors reserve the right to challenge the accuracy, relevancy and veracity of the cited references.

1) U.S. Pat. No. 7,963,389—Broers et al. enables a conveyor. Among other things, Broers does not disclose an endless carrier for a conveyor comprising: a) a plurality of slats; each slat having a superior article carrying side and an opposed side, wherein some of the opposed sides comprise: i) a first landing gear carrying a first wheel engaging a first track of the conveyor and ii) a second landing gear carrying a second wheel engaging a second track of said conveyor; and b) a chain pivotable through a plurality of axes circulating about the conveyor comprising a plurality of links interconnecting the slats, wherein some of the plurality of links further comprise roller bearings for engaging a portion of a wall positioned between the first track and the second track.

2) U.S. Pat. No. 6,336,551—Balk enables a conveyor. Among other things, Balk does not disclose an endless carrier for a conveyor comprising: a) a plurality of slats; each slat having a superior article carrying side and an opposed side, wherein some of the opposed sides comprise: i) a first landing gear carrying a first wheel engaging a first track of the conveyor and ii) a second landing gear carrying a second wheel engaging a second track of said conveyor; and b) a chain pivotable through a plurality of axes circulating about the conveyor comprising a plurality of links interconnecting the slats, wherein some of the plurality of links further comprise roller bearings for engaging a portion of a wall positioned between the first track and the second track.

3) U.S. Pat. No. 3,627,109—Cabak enables a conveyor construction. Among other things, Cabak does not disclose an endless carrier for a conveyor comprising: a) a plurality of slats; each slat having a superior article carrying side and an opposed side, wherein some of the opposed sides comprise: i) a first landing gear carrying a first wheel engaging a first track of the conveyor and ii) a second landing gear carrying a second wheel engaging a second track of said conveyor; and b) a chain pivotable through a plurality of axes circulating about the conveyor comprising a plurality of links interconnecting the slats, wherein some of the plurality of links further comprise roller bearings for engaging a portion of a wall positioned between the first track and the second track.

4) U.S. Pat. No. 3,826,352—Van Zon, et al. enables a spiral column for endless chain conveyor. Among other things, Van Zon does not disclose an endless carrier for a conveyor comprising: a) a plurality of slats; each slat having a superior article carrying side and an opposed side, wherein some of the opposed sides comprise: i) a first landing gear carrying a first wheel engaging a first track of the conveyor and ii) a second landing gear carrying a second wheel engaging a second track of said conveyor; and b) a chain pivotable through a plurality of axes circulating about the conveyor comprising a plurality of links interconnecting the slats, wherein some of the plurality of links further comprise roller bearings for engaging a portion of a wall positioned between the first track and the second track.

5) U.S. Pat. No. 5,176,247—Counter, et al. enables a sideplexing conveyor chain including low centerline hinge pin. Among other things, Counter does not disclose an endless carrier for a conveyor comprising: a) a plurality of slats; each slat having a superior article carrying side and an opposed side, wherein some of the opposed sides comprise: i) a first landing gear carrying a first wheel engaging a first track of the conveyor and ii) a second landing gear carrying a second wheel engaging a second track of said conveyor; and b) a chain pivotable through a plurality of axes circulating about the conveyor comprising a plurality of links interconnecting the slats, wherein some of the plurality of links further comprise roller bearings for engaging a portion of a wall positioned between the first track and the second track.

6) U.S. Pat. No. 5,775,480—Lapeyre, et al. enables a low-friction conveyor assembly. Among other things, Lapeyre does not disclose an endless carrier for a conveyor comprising: a) a plurality of slats; each slat having a superior article carrying side and an opposed side, wherein some of the opposed sides comprise: i) a first landing gear carrying a first wheel engaging a first track of the conveyor and ii) a second landing gear carrying a second wheel engaging a second track of said conveyor; and b) a chain pivotable through a plurality of axes circulating about the conveyor comprising a plurality of links interconnecting the slats, wherein some of the plurality of links further comprise roller bearings for engaging a portion of a wall positioned between the first track and the second track.

7) U.S. Pat. No. 7,556,142—Stebnicki, et al. enables a conveyor plate with integrated roller. Among other things, Stebnicki does not disclose an endless carrier for a conveyor comprising: a) a plurality of slats; each slat having a superior article carrying side and an opposed side, wherein some of the opposed sides comprise: i) a first landing gear carrying a first wheel engaging a first track of the conveyor and ii) a second landing gear carrying a second wheel engaging a second track of said conveyor; and b) a chain pivotable through a plurality of axes circulating about the conveyor comprising a plurality of links interconnecting the slats, wherein some of the plurality of links further comprise roller bearings for engaging a portion of a wall positioned between the first track and the second track.

8) U.S. Pat. No. 7,854,315—Stebnicki, et al. enables a conveyor plate with integrated roller. The '315 Patent is a divisional Patent flowing from U.S. Pat. No. 7,556,142—Stebnicki, et al. Thus, the '315 Patent provides the same disclosure as the '142 Patent.

9) U.S. Pat. No. 4,645,070—Homeier enables a dual bend conveyor. Among other things, Homeier does not disclose an endless carrier for a conveyor comprising: a) a plurality of slats; each slat having a superior article carrying side and an opposed side, wherein some of the opposed sides comprise: i) a first landing gear carrying a first wheel engaging a first track of the conveyor and ii) a second landing gear carrying a second wheel engaging a second track of said conveyor; and b) a chain pivotable through a plurality of axes circulating about the conveyor comprising a plurality of links interconnecting the slats, wherein some of the plurality of links further comprise roller bearings for engaging a portion of a wall positioned between the first track and the second track.

10) US Published Patent Application 20050150748—Zubair, et al. discloses a low-friction conveyor. Among other things, Zubair does not disclose an endless carrier for a conveyor comprising: a) a plurality of slats; each slat having a superior article carrying side and an opposed side, wherein some of the opposed sides comprise: i) a first landing gear carrying a first wheel engaging a first track of the conveyor and ii) a second landing gear carrying a second wheel engaging a second track of said conveyor; and b) a chain pivotable through a plurality of axes circulating about the conveyor comprising a plurality of links interconnecting the slats, wherein some of the plurality of links further comprise roller bearings for engaging a portion of a wall positioned between the first track and the second track.

11) WO 2012154030—Ooi, B., et al. discloses a link for a conveyor chain, a conveyor chain made up of said links and a method of operation of said conveyor chain. Among other things, Ooi does not disclose an endless carrier for a conveyor comprising: a) a plurality of slats; each slat having a superior article carrying side and an opposed side, wherein some of the opposed sides comprise: i) a first landing gear carrying a first wheel engaging a first track of the conveyor and ii) a second landing gear carrying a second wheel engaging a second track of said conveyor; and b) a chain pivotable through a plurality of axes circulating about the conveyor comprising a plurality of links interconnecting the slats, wherein some of the plurality of links further comprise roller bearings for engaging a portion of a wall positioned between the first track and the second track.

SUMMARY OF THE INVENTION

Unlike prior art systems, the current invention includes a novel and nonobvious endless carrier for a conveyor transporting articles along a generally vertical path.

Among other aspects of preferred embodiments of the present invention, a unique clevis and roller bearing are attached to one or more interconnected chain links that are connected to a slat of the endless carrier.

An aspect of a preferred embodiment of the current invention includes the positioning of opposed landing gears on opposite sides of the slat's central transverse axis of one or more slats of the endless carrier.

Another aspect of a preferred embodiment of the current invention is to provide an endless carrier movable about a plurality of axes.

Yet another aspect of a preferred embodiment of the current invention is to provide an endless carrier movable through one or more curves.

Still another aspect of a preferred embodiment of the current invention is to provide a support for the endless carrier including opposed tracks and a wall positioned between the opposed tracks capable of engaging the wheels of the landing gear.

Another aspect of a preferred embodiment of the current invention is to provide a support for the endless carrier including opposed tracks and two walls positioned between the opposed tracks capable of engaging the wheels of the landing gear.

A preferred embodiment of the current invention can be described as a helical conveyor for transporting articles along a generally vertical path comprising: a) a first helical track positioned about a first side of the helical conveyor; b) a second helical track, opposite the first track, positioned about a second side of the helical conveyor; c) a helical wall positioned between the first helical track and the second helical track, wherein at least a portion of the helical wall spirals simultaneously with the helical conveyor; d) a chain pivotable through a plurality of axes circulating about the helical conveyor; the chain comprising a plurality of links having opposed first and second opposed outer sides with clevises juxtaposed some of the first outer sides of the links, wherein each clevis is bolted to its corresponding link and comprises a fastener securing a roller bearing for engaging the helical wall; e) a plurality of slats connected to the plurality of links; each slat having a superior article carrying side and an opposed side, wherein the opposed side of each slat further comprises: i) a first landing gear integral with the slat and carrying a first wheel for engaging the first helical track, wherein vertical and horizontal movement but not rotational movement of the first wheel is limited by contact with the first helical track; and ii) a second landing gear integral with the slat and carrying a second wheel for engaging the second helical track, wherein vertical and horizontal movement but not rotational movement of the second wheel is limited by contact with the second helical track; and d) a drive for driving the chain.

Another preferred embodiment of the current invention can be described as a spiral conveyor for transporting articles along a generally vertical path comprising: a) a first track spiraling simultaneously with the vertical path; b) a second track, opposite the first track, spiraling simultaneously with the generally vertical path; c) a wall positioned between the first track and the second track, wherein at least a portion of the wall spirals simultaneously with the tracks; d) a chain, pivotable through a plurality of axes, circulating about the spiral conveyor and with the generally vertical path; the chain comprising a plurality of links including clevises juxtaposed some of the links, wherein each clevis is connected to a corresponding link and comprises a roller bearing for engaging the wall; e) a plurality of slats connected to the plurality of links; each slat having a superior article carrying side and an opposed side, wherein some of the opposed sides of the plurality of slats further comprise: i) a first landing gear carrying a first wheel engaging the first track, wherein vertical and horizontal movement but not rotational movement of the first wheel is limited by contact with the first track; and ii) a second landing gear carrying a second wheel engaging the second track, wherein vertical and horizontal movement but not rotational movement of the second wheel is limited by contact with the second track; and f) a drive for driving the chain.

Yet another preferred embodiment of the current invention can be described as a conveyor transporting articles along a path congruent with the conveyor; the conveyor comprising: a) a chain, pivotable through a plurality of axes, circulating about the conveyor and with the path; the chain comprising a plurality of links including roller bearings juxtaposed some of the links; b) a plurality of slats connected to the chain; each slat having a superior article carrying side and an opposed side, wherein some opposed sides of the plurality of slats further comprise: i) a first landing gear carrying a first wheel engaging a first track, wherein vertical and horizontal movement but not rotational movement of the first wheel is limited by contact with the first track; and ii) a second landing gear carrying a second wheel engaging the second track, wherein vertical and horizontal movement but not rotational movement of the second wheel is limited by contact with the second track; c) a wall for engaging the roller bearings; the wall positioned between the first track and the second track, wherein at least portions of the first track, the second track and the wall are aligned with the path; and d) a drive for driving the chain.

Yet another preferred embodiment of the current invention can be described as an endless carrier for a conveyor; the endless carrier comprising: a) a plurality of slats; each slat having a superior article carrying side and an opposed side, wherein some of the opposed sides of the plurality of slats further comprise: i) a first landing gear carrying a first wheel engaging a first track of the conveyor such that vertical and horizontal movement but not rotational movement of the first wheel is limited by the first track; and ii) a second landing gear carrying a second wheel engaging a second track of the conveyor, such that vertical and horizontal movement but not rotational movement of the second wheel is limited by the second track; and b) a chain pivotable through a plurality of axes circulating about the conveyor; the chain comprising a plurality of links interconnecting the slats, wherein some of the plurality of links further comprise roller bearings for engaging a portion of a wall positioned between the first track and the second track.

Still another preferred embodiment of the current invention can be described as an endless carrier for a conveyor comprising: a) a plurality of adjacent interconnected links comprising one or more roller bearings engaging a portion of the conveyor, wherein at least a part of the portion is associated with an article transportation path of the conveyor; and b) slats connected to the plurality of interconnected links for moving articles through the transportation path, wherein the slats comprise superior article carrying sides and opposed sides, and wherein some of the opposed sides of the slats comprise: i) a first landing gear carrying a first wheel for engaging a first track; and ii) a second landing gear carrying a second wheel for engaging a second track, wherein the tracks limit vertical and horizontal movements but not rotational movements of the wheels.

Still another preferred embodiment of the current invention can be described as an a slat for an endless carrier of a conveyor; the slat comprising a superior article carrying side and an opposed side, wherein the opposed side further comprises first and second landing gears carrying wheels for engaging opposed tracks traversing at least an approximate distance of an article transportation path of the conveyor.

It is the novel and unique interaction of these simple elements which creates the system within the ambit of the present invention. Pursuant to the Articles of the Patent Cooperation Treaty, select preferred embodiments of the current invention follow. However, it is to be understood that the descriptions of the preferred embodiments do not limit the scope of the present invention.

DESCRIPTION OF THE PREFERRED EMBODIMENTS

Among other things, the present invention includes a conveyor and endless carrier for the conveyor. Preferred embodiments of the current invention are particularly useful for spiral conveyors but can also be used with straight conveyors or other conveyors having one or more curves. Select preferred embodiments of the current endless carriers include slats interconnected by a chain that is pivotable through a plurality of axes. In accordance with the present invention, at least some of the slats have landing gears for engaging tracks where the tracks correspond with the conveyor's article transportation path. For this Application, article transportation path is defined as the distance traveled by the conveyor's endless carrier between the article's ingress point onto the endless carrier and the article's egress point away from the conveyor. For select preferred embodiments, at least some of the chain's links comprise roller bearings for engaging a wall positioned between the tracks. In other select preferred embodiments, at least some of the chain's links comprise roller bearings capable of engaging opposed walls positioned between the tracks.

Within the scope of the current invention, preferred embodiments of conveyors include a support for the endless carrier. The support can comprise first and second tracks capable of engaging wheels of the slat's landing gears and a wall positioned between the first track and second tracks where at least part of the wall corresponds to the curvature of the article transportation path.

The unique clevis/roller bearing/link construction of the present invention directs the tensile load between the wall and the bolt associated with preselected links of the invention's plurality of interconnected links. For select preferred embodiments, incorporation of the clevis/roller bearing/link into the current invention allows the endless carrier to move through a plurality of axes. Through experimentation, it has been discovered that use of a bolt or connector to connect a clevis to its corresponding link directs the tensile load between the wall and the links having clevises holding roller bearings and engaging the wall to the bolt and its corresponding link rather the entire chain. This construction allows tensile load to be centered and guided along the longitudinal axis of the bolt which reduces unintentional movements of the interconnected links as the plurality of links circulate about the conveyor as well reducing wear and tear of the links. By way of illustration, the lateral tensile load is center guided to the connector and center loaded to the connector or bolt.

It has also been discovered that increasing the pitch of each interconnected link allows for the selective engineering of designated generally lateral and generally vertical pivoting of the links, i.e., one by one. The one by one pivoting of each link about the link's bolt/link/clevis combination can reduce the unintended occurrence of multiple links of the endless carrier simultaneously pivoting. Among other things, such connector-clevis centered construction improves efficiency and durability of the current endless carrier and allows the use of less components than disclosed by the prior art.

A preferred embodiment of the slat and landing gear/wheel construction of the endless carrier allows distribution of the weight-load moving through the article transportation path to be further distributed through the landing gear's wheels onto the tracks engaged by the wheels. Along with being undisclosed by prior endless carriers, this novel and nonobvious construction allows the current endless carriers to withstand greater lateral tensile load and to transport greater article loads than previously considered possible while limiting any weight-dependent flexing of the wings or opposed distal sides of the slat. Among other things, such unique construction eliminates friction between the track facing side of the slat and the support. When compared against prior art slats that ride across a conveyor bed, power consumption is decreased and article load transport is enhanced. Preferred embodiments of the current endless carrier are well-suited for helical conveyors including one or more curves.

Figure 1:
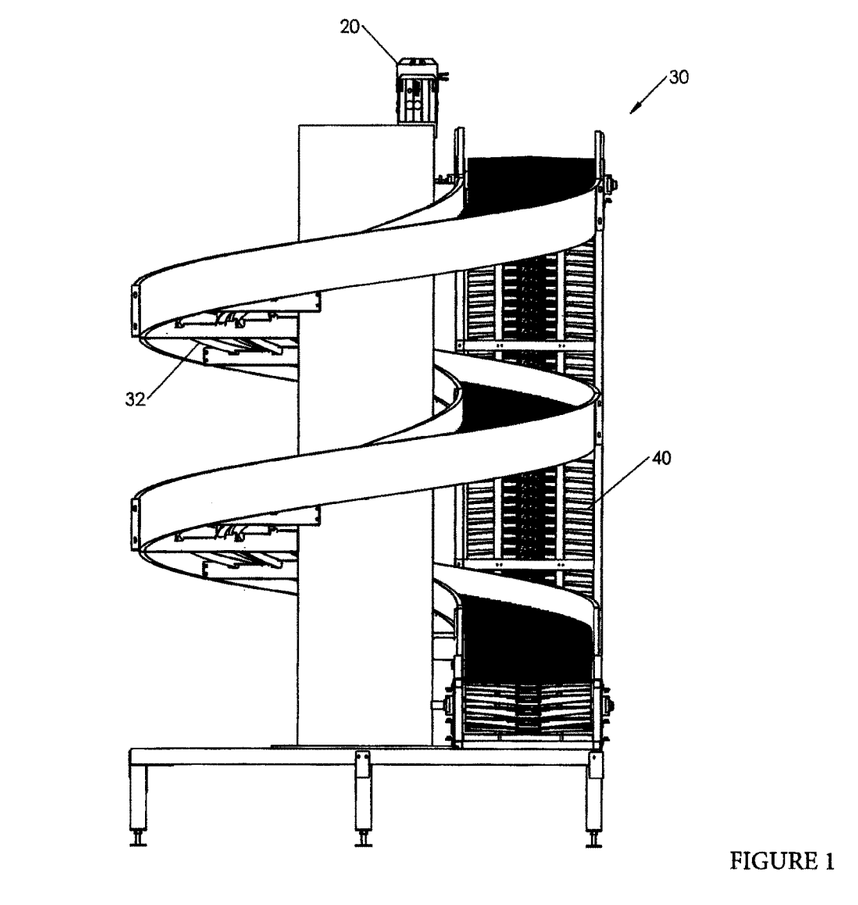
FIG. 1 is a perspective of a preferred embodiment of a conveyor for transporting articles along a generally vertical path and endless carrier for a conveyor within the scope of the current invention.

FIG. 1 is a perspective of a preferred embodiment of a conveyor (30) for transporting articles along a generally vertical path and endless carrier (40) for a conveyor within the scope of the current invention. Endless carrier (40) is driven by drive (20) and circulates about conveyor (30) and through an article transportation path (32).

Figure 2:
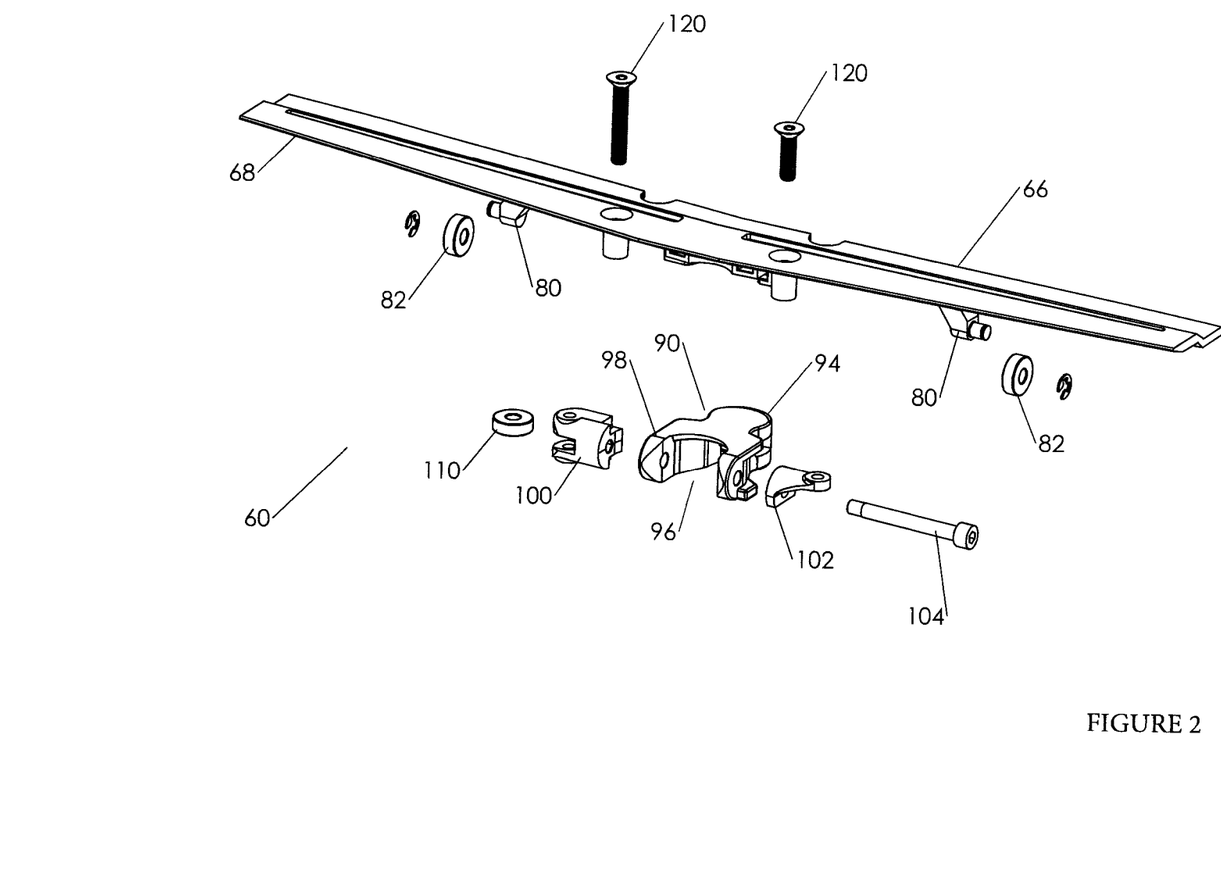
FIG. 2 is an exploded view of a preferred embodiment of a slat of an endless carrier within the scope of the current invention.

FIG. 2 is an exploded view of a preferred embodiment of a slat (60) of endless carrier (40) where slat (60) is provided with landing gears (80f, 80s). Slat (60) includes a superior article carrying side (66) and an opposed side (68). Select preferred embodiments of slat (60) have a landing gears (80f, 80s) positioned on each side of the central transverse axis of slat (60). The central transverse axis of slat (60) runs along a width of slat (60) corresponding to the longitudinal axis of slat's (60) corresponding link (90). Among other things, utilization of the landing gears (80f, 80s) distributes the weight load over slat (60) and reduces the weight load concentrated about the center of slat (60). Preferred embodiments using landing gears (80f, 80s) reduce any friction generated by the slat's opposed side (68) to miniscule levels. Further, landing gears (80f, 80s) assist in stabilizing slats (60) as well as weight loads transported by endless carrier (40). Within the scope of the current invention, opposed landing gears (80f, 80s) can be integral with or mounted to slat (60). Wheels (82f, 82s) are secured to landing gears (80f, 80s) in any manner acceptable in the art.

As best shown in FIGS. 1, 2, 3 and 4, coupling end (94) of link (90) is coupled with receiving end (96) of adjacent link (90). Fit (92) between coupling end (94) and receiving end (96) of adjacent links (90) interconnects the adjacent links (90) while allowing adjacent links (90) to pivot about fit (92) when required by endless carrier (40). A plurality of interconnected links (90) creates a chain within the scope of the present invention.

Figure 3:
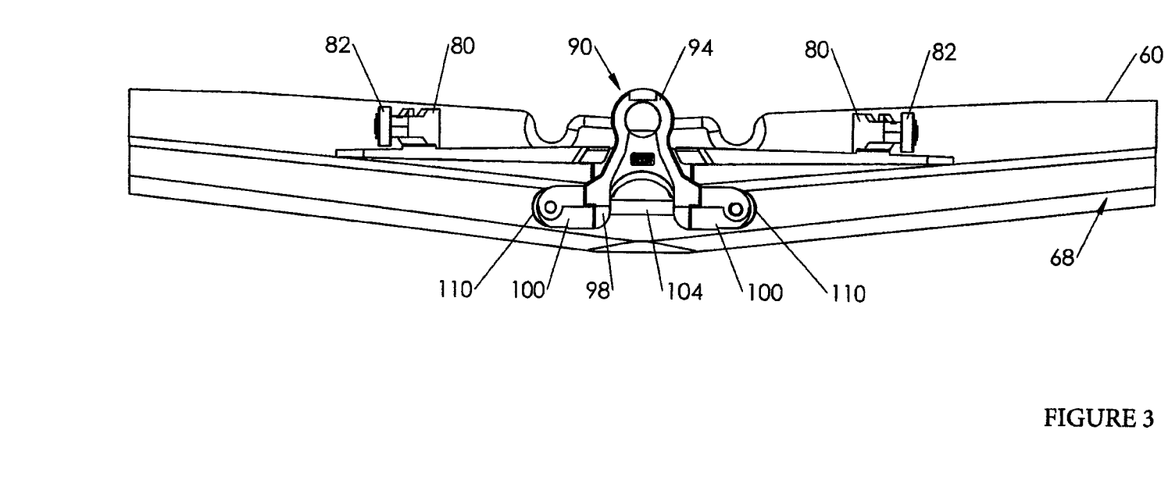
FIG. 3 is a bottom view of a link including opposed roller bearings.

As shown in FIG. 3, for select preferred embodiments of the current invention, link (90) is provided with a clevis/roller bearing (100, 110) on two outer sides of link (90). Within the scope of the present invention, inclusion of two clevis/roller bearing (100, 110) combinations assist circulation of a chain including a plurality of links (90) through multidirectional curves of conveyor (30) (not shown in FIG. 3).

Figure 4:
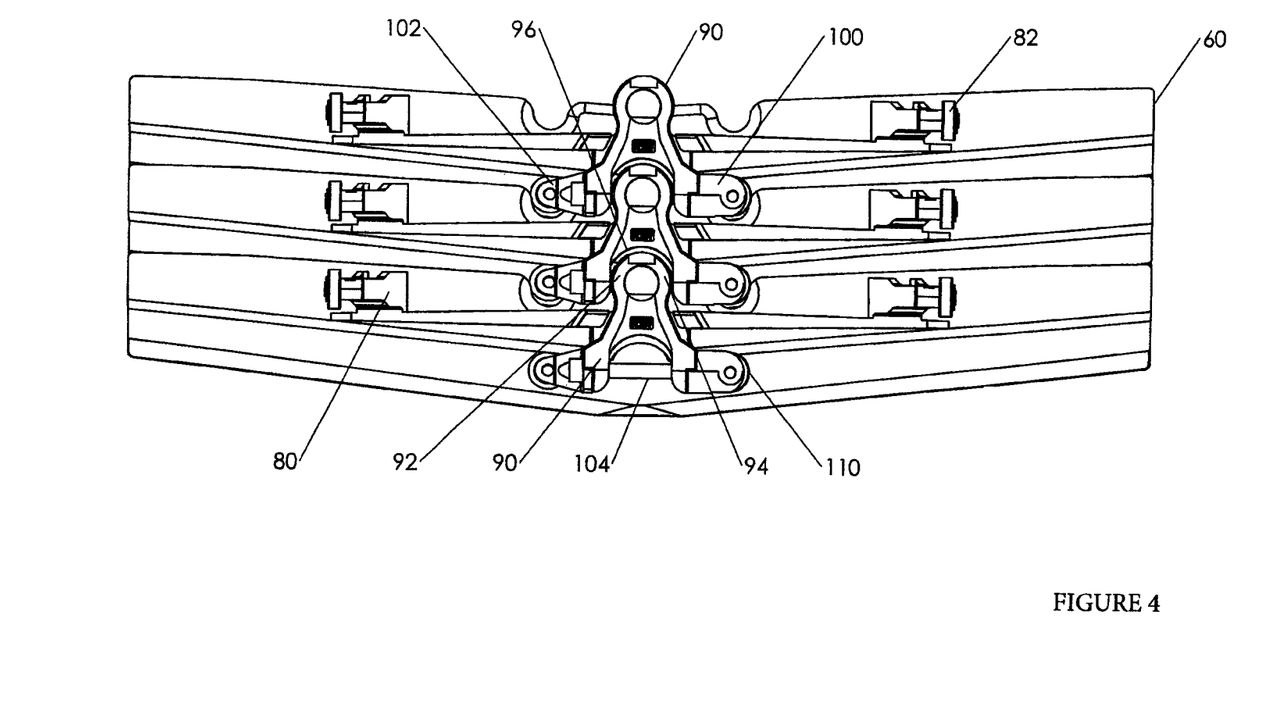
FIG. 4 is a bottom view of a preferred embodiment of a section of interconnected links forming the chain connected to the slats of the endless carrier within the scope of the present invention.

Within the ambit of the current invention, as shown in FIG. 2, clevis or yolk (100) is juxtaposed a first side (98) of link (90). In the absence of two yolks (100) connected to link (90), bracelet (102) can be juxtaposed a second side (98) opposite clevis (100) of link (90). As shown in FIGS. 3 and 4, bolt (104) secures two yolks (100) or clevis (100) and bracelet (102) to a first link (90) and an adjacent link (90) of chain. Although a clevis (100) is shown as a preferred embodiment in FIG. 2, other less specifically dimensioned yolks (100) are also functional with the current invention.

As shown in FIGS. 2-6, bolt or connector (104) secures bracelet (102) and clevis (100) to link (90). For preferred embodiments of the current invention, fasteners (120) attach bracelet (102), clevis (100) and roller bearing (110) to slat (60). In operation of endless carrier (40), coupling end (94) of a first link (90) can pivot in a first direction about fit (92) and a receiving end (96) of first link (90) can pivot in a second direction about bolt (104). Securing roller bearing (110) and clevis (100) to slat (60) with bolt (104) transfers the majority of the lateral tensile load generated by roller bearing's (110) contact with wall (180) to bolt (104) which reduces the lateral stress load applied to link (90) while limiting any undesired lateral movement of the plurality of links (90) as the links (90) circulate about conveyor (30). For select preferred embodiments of the present invention, the majority of lateral stress load is transferred along the lengthwise axis of bolt (104) rather than slat (60).

FIG. 4 is a bottom view of a preferred embodiment of a section of interconnected links (90) creating the chain connected to the slats (60) of the endless carrier (40) of the present invention. The FIG. 4 embodiment depicts a clevis/roller bearing combination (100, 110) attached to only one side of a link (90). As previously indicated, when the clevis/roller bearing combination (100, 110) is attached to only some of the links (90), the present invention is functional.

Figure 5:
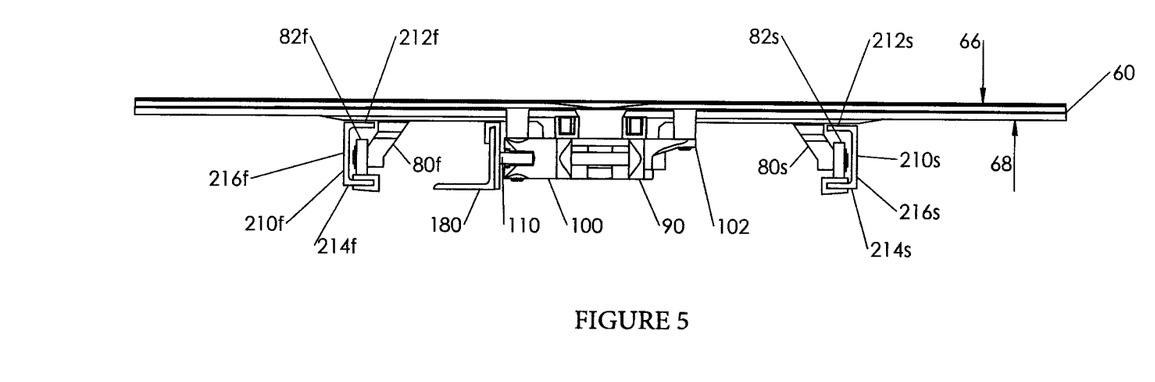
FIG. 5 is a rear view of a preferred embodiment of a slat of an endless carrier within the scope of the present invention.

FIG. 5 is a rear view of a preferred embodiment of slat (30) of endless carrier (40). Slat (60) includes superior side (66) and opposed side (68). Along the article transportation path of endless carrier (40), opposed side (68) is superior to track (210f, 210s) receiving wheels (82f, 82s) carried by landing gear (80f, 80s) depending from inferior side (68) of slat (60). Landing gears (80f, 80s) can be integral with slat (60) or attached to slat (60) via any means acceptable in the art. Further, in select preferred embodiments of endless carrier (40), it is not required that landing gears (80f, 80s) are attached to every slat (60) of endless carrier (40).

Preferred embodiments of tracks (210f, 210s) are provided with upper rails (212f, 212s), lower rails (214f, 214s) and connectors (216f, 216s). The combination of upper rails (212f, 212s), lower rails (214f, 214s) and connectors (216f, 216s) controls the vertical and horizontal movement but not the rotational movement of wheels (82f, 82s) of landing gears (80f, 80s). Construction of tracks (210f, 210s) in accordance with select preferred embodiments of the current invention allows tracks (210f, 210s) to capture wheels (82f, 82s) and enhances safer use of endless carrier (40).

Along the article transportation path, roller bearing (110) associated with clevis (110) engages wall (180) and assists endless carrier's (40) movement through a curve of conveyor (30). This preferred construction provides that roller bearing (110) engages wall (180) at a point that is generally perpendicular to link (90). Preferred embodiments of the structures portrayed in FIG. 5 are generally used for conveyors having curves only in a single direction and do not require that a clevis be attached to each link of chain (90).

Figure 6:
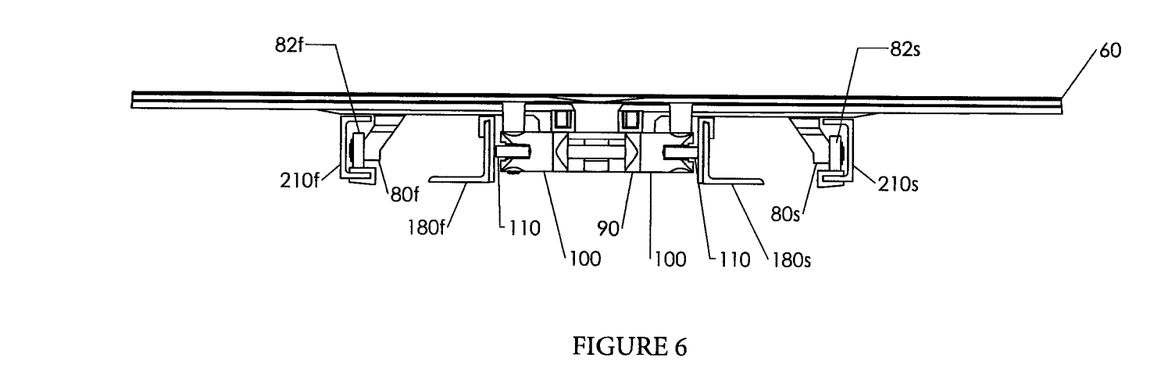
FIG. 6 is a rear view of a preferred embodiment of a slat of an endless carrier within the scope of the present invention.

FIG. 6 is a rear view of a preferred embodiment of a slat (30) of endless carrier (40). As shown in the preferred embodiment of FIG. 6, two clevises (100) carrying a roller bearing (110) are attached to opposed outer sides of chain (90). Along the article transportation path, each roller bearing (110) engages a wall (180*f*, 180*s*) and assists endless carrier's (40) movement through curves of conveyor (30). Preferred embodiments of the structures portrayed in FIG. 6 are generally used for conveyors having curves in more than a single direction.

Pursuant to the Articles of the Patent Cooperation Treaty, preferred embodiments of the current system invention have been disclosed and enabled.

What is claimed is:

1. A spiral conveyor for transporting articles along a generally vertical path comprising:
    a) a first track spiraling simultaneously with said vertical path;
    b) a second track, opposite said first track, spiraling simultaneously with said generally vertical path;
    c) a wall positioned between said first track and said second track, wherein at least a portion of said wall spirals simultaneously with said tracks;
    d) a chain, pivotable through a plurality of axes, circulating about said spiral conveyor and with said generally vertical path; said chain comprising a plurality of links including devises juxtaposed some of said links, wherein each clevis is connected to a corresponding link and comprises a roller bearing for engaging said wall;
    e) a plurality of slats connected to said plurality of links; each slat having a superior article carrying side and an opposed side, wherein some of said opposed sides of said plurality of slats further comprise:
        i) a first landing gear, distinct from said chain, carrying a first wheel engaging said first track, wherein vertical and horizontal movement but not rotational movement of said first wheel is limited by contact with said first track; and
        ii) a second landing gear, distinct from said chain, carrying a second wheel engaging said second track, wherein vertical and horizontal movement but not rotational movement of said second wheel is limited by contact with said second track; and
    f) a drive for driving said chain.

2. The spiral conveyor of claim 1, wherein said first and second landing gears are integral with said slat.

3. A conveyor transporting articles along a path congruent with said conveyor; said conveyor comprising:
    a) a chain, pivotable through a plurality of axes, circulating about said conveyor and with said path; said chain comprising a plurality of links including roller bearings juxtaposed some of said links;
    b) a plurality of slats connected to said chain; each slat having a superior article carrying side and an opposed side, wherein some opposed sides of said plurality of slats further comprise:
        i) a first landing gear, distinct from said chain, carrying a first wheel engaging a first track, wherein vertical and horizontal movement but not rotational movement of said first wheel is limited by contact with said first track; and
        ii) a second landing gear, distinct from said chain, carrying a second wheel engaging said second track, wherein vertical and horizontal movement but not rotational movement of said second wheel is limited by contact with said second track;
    c) a wall for engaging said roller bearings; said wall positioned between said first track and said second track, wherein at least portions of said first track, said second track and said wall are aligned with said path; and
    d) a drive for driving said chain.

4. The conveyor of claim 3, wherein each said roller bearing is connected to its corresponding link of said chain, via a combination comprising a clevis and a connector.

5. The conveyor of claim 4, wherein said first and said second landing gears are integral with said slat.

6. The conveyor of claim 5 comprising one or more curves.

7. The conveyor of claim 6, wherein said devises are connected to the same side of said chain.

8. An endless carrier for a conveyor; said endless carrier comprising:
    a) a plurality of slats; each slat having a superior article carrying side and an opposed side, wherein some of said opposed sides of said plurality of slats further comprise:
        i) a first landing gear carrying a first wheel engaging a first track of said conveyor such that vertical and horizontal movement but not rotational movement of said first wheel is limited by said first track; and
        ii) a second landing gear carrying a second wheel engaging a second track of said conveyor, such that vertical and horizontal movement but not rotational movement of said second wheel is limited by said second track distinct from said first track; and
    b) a chain pivotable through a plurality of axes circulating about said conveyor; said chain comprising a plurality of links interconnecting said slats, wherein some of said plurality of links further comprise roller bearings for engaging a portion of a wall positioned between said first track and said second track.

9. The conveyor of claim 8, wherein each said roller bearing is connected to its corresponding link of said chain, via a combination comprising a clevis and a connector.

10. The conveyor of claim 9 comprising one or more curves.

11. The conveyor of claim 10, wherein said first and said second landing gears are integral with said slat.

12. The conveyor of claim 11, wherein said devises are connected to the same side of said chain.

13. An endless carrier for a conveyor comprising:
    a) a plurality of adjacent interconnected links comprising one or more roller bearings engaging a portion of said conveyor, wherein at least a part of said portion is associated with an article transportation path of said conveyor; and
    b) slats connected to said plurality of interconnected links for moving articles through said transportation path, wherein said slats comprise superior article carrying sides and opposed sides, and wherein some of said opposed sides of said slats comprise:
        i) a first landing gear, distinct from said links, carrying a first wheel for engaging a first track, wherein an axis of rotation of said first wheel is perpendicular to one of said plurality of adjacent interconnected links connected with said first landing gear's corresponding slat; and
        ii) a second landing gear, distinct from said links, carrying a second wheel for engaging a second track, wherein an axis of rotation of said second wheel is perpendicular to one of said plurality of adjacent interconnected links connected with said second landing gear's corresponding slat, and wherein said tracks limit vertical and horizontal movements but not rotational movements of said wheels.

14. The conveyor of claim 13, wherein said portion of said conveyor engaged by said roller bearings is positioned between said landing gears.

15. The conveyor of claim 14, wherein each said roller bearing is connected to its corresponding interconnected link, via a combination comprising a clevis and a connector.

16. The conveyor of claim 15, wherein said interconnected links are pivotable about said connector and a fit between said adjacent interconnected links.

17. The conveyor of claim 16, wherein said connector bears a majority of a lateral tensile load associated with said roller bearing.

18. A slat for an endless carrier connected to an interconnected link of a conveyor; said slat comprising a superior article carrying side and an opposed side, wherein said opposed side further comprises first and second landing gears, distinct from said interconnected link, carrying wheels for engaging opposed tracks traversing at least an approximate distance of an article transportation path of said conveyor, wherein axes of rotation of said wheels, are perpendicular to said interconnected link.

19. The slat of claim 18, wherein said tracks limit vertical and horizontal movement but not rotational movement of said wheels.

20. The slat of claim 19, wherein said first and second landing gears are integral with said slat.

\* \* \* \* \*

UNITED STATES PATENT AND TRADEMARK OFFICE
CERTIFICATE OF CORRECTION

| | |
|---|---|
| PATENT NO. | : 9,561,907 B2 |
| APPLICATION NO. | : 14/768716 |
| DATED | : February 7, 2017 |
| INVENTOR(S) | : Harlen Hoang et al. |

It is certified that error appears in the above-identified patent and that said Letters Patent is hereby corrected as shown below:

In the Claims

Claim 1 should read:

-- A spiral conveyor for transporting articles along a generally vertical path comprising: a) a first track spiraling simultaneously with said vertical path; b) a second track, opposite said first track, spiraling simultaneously with said generally vertical path; c) a wall positioned between said first track and said second track, wherein at least a portion of said wall spirals simultaneously with said tracks; d) a chain, pivotable through a plurality of axes, circulating about said spiral conveyor and with said generally vertical path; said chain comprising a plurality of links including clevises juxtaposed some of said links, wherein each clevis is connected to a corresponding link and comprises a roller bearing for engaging said wall; e) a plurality of slats connected to said plurality of links; each slat having a superior article carrying side and an opposed side, wherein some of said opposed sides of said plurality of slats further comprise: i) a first landing gear, distinct from said chain, carrying a first wheel engaging said first track, wherein vertical and horizontal movement but not rotational movement of said first wheel is limited by contact with said first track; and ii) a second landing gear, distinct from said chain, carrying a second wheel engaging said second track, wherein vertical and horizontal movement but not rotational movement of said second wheel is limited by contact with said second track; and f) a drive for driving said chain. --

Claim 7 should read:

-- The conveyor of claim 6, wherein said clevises are connected to the same side of said chain. --

Claim 12 should read:

-- The conveyor of claim 11, wherein said clevises are connected to the same side of said chain. --

Signed and Sealed this
Twenty-fifth Day of April, 2017

Michelle K. Lee
*Director of the United States Patent and Trademark Office*